United States Patent
Tuukkanen

(10) Patent No.: US 9,776,587 B2
(45) Date of Patent: Oct. 3, 2017

(54) METHOD AND APPARATUS FOR CAUSING A CHANGE IN AN ACTION OF A VEHICLE FOR SAFETY

(71) Applicant: Marko Tapio Tuukkanen, Berlin (DE)

(72) Inventor: Marko Tapio Tuukkanen, Berlin (DE)

(73) Assignee: HERE Global B.V., Veldhoven (NL)

( * ) Notice: Subject to any disclaimer, the term of this patent is extended or adjusted under 35 U.S.C. 154(b) by 468 days.

(21) Appl. No.: 13/689,131

(22) Filed: Nov. 29, 2012

(65) Prior Publication Data
US 2014/0145838 A1 May 29, 2014

(51) Int. Cl.
*B60R 21/013* (2006.01)
*G08G 1/16* (2006.01)
(Continued)

(52) U.S. Cl.
CPC ............ *B60R 21/013* (2013.01); *B60Q 1/085* (2013.01); *B60Q 1/143* (2013.01); *B60Q 9/008* (2013.01); *G08G 1/162* (2013.01); *G08G 1/164* (2013.01); *B60Q 2300/41* (2013.01); *B60Q 2300/42* (2013.01); *B60Q 2300/47* (2013.01)

(58) Field of Classification Search
CPC .......... B60Q 9/008; B60Q 1/143; B60Q 1/46; B60Q 1/50; B60Q 1/525; B60Q 2300/314; B60Q 1/085; B60Q 2300/41; B60Q 2300/42; B60Q 2300/47; G08G 1/162; G08G 1/16; G08G 1/167; G08G 1/164; Y10S 367/909; B60R 21/013
See application file for complete search history.

(56) References Cited

U.S. PATENT DOCUMENTS 5,983,161 A * 11/1999 Lemelson ............... G01S 19/11
340/436
7,005,977 B1 2/2006 Tengler et al.
(Continued)

FOREIGN PATENT DOCUMENTS

DE 102004027532 A1 12/2005
DE 102010007866 A1 8/2011
(Continued)

OTHER PUBLICATIONS

Notification of Transmittal of the International Search Report and the Written Opinion of the International Searching Authority, or the Declaration; International Search Report; Written Opinion for corresponding International Application No. PCT/EP2013/074948, dated May 9, 2014, 18 pages.
(Continued)

*Primary Examiner* — Nay Tun
(74) *Attorney, Agent, or Firm* — Ditthavong & Steiner, P.C.

(57) ABSTRACT

An approach for causing a change in an action of a vehicle based on real-time information associated with vehicles is described. A vehicle safety platform may determine at least one distance between a user device and at least another user device based, at least in part, on sensor information associated with at least one of the user device and the at least another user device. The vehicle safety platform may further cause, at least in part, a change in an action of at least one of the user device and the at least another user device, wherein the change in the action is based, at least in part, on the at least one distance.

20 Claims, 12 Drawing Sheets

(51) Int. Cl.
*B60Q 1/08* (2006.01)
*B60Q 1/14* (2006.01)
*B60Q 9/00* (2006.01)

(56) References Cited

U.S. PATENT DOCUMENTS

| | | | | |
|---|---|---|---|---|
| 7,541,743 | B2* | 6/2009 | Salmeen | B60Q 1/085 |
| | | | | 315/77 |
| 8,587,418 | B2* | 11/2013 | Mochizuki et al. | 340/435 |
| 2003/0141966 | A1 | 7/2003 | Strumolo et al. | |
| 2004/0090319 | A1* | 5/2004 | Kimura et al. | 340/435 |
| 2004/0114381 | A1* | 6/2004 | Salmeen | B60Q 1/085 |
| | | | | 362/465 |
| 2005/0036325 | A1* | 2/2005 | Furusawa | B60Q 1/06 |
| | | | | 362/460 |
| 2006/0106538 | A1* | 5/2006 | Browne et al. | 701/301 |
| 2007/0147055 | A1* | 6/2007 | Komatsu | B60Q 1/085 |
| | | | | 362/464 |
| 2007/0164896 | A1* | 7/2007 | Suzuki | G01S 7/006 |
| | | | | 342/70 |
| 2007/0191997 | A1* | 8/2007 | Isaji et al. | 701/1 |
| 2008/0030374 | A1* | 2/2008 | Kumon | B60Q 1/143 |
| | | | | 340/937 |
| 2009/0086497 | A1* | 4/2009 | Kamioka | B60Q 1/085 |
| | | | | 362/466 |
| 2009/0279317 | A1* | 11/2009 | Tatara | B60Q 1/12 |
| | | | | 362/465 |
| 2011/0169626 | A1 | 7/2011 | Sun et al. | |
| 2011/0227713 | A1* | 9/2011 | Amann | 340/435 |
| 2012/0065858 | A1 | 3/2012 | Nickolaou et al. | |
| 2012/0268262 | A1 | 10/2012 | Popovic | |

FOREIGN PATENT DOCUMENTS

| | | |
|---|---|---|
| EP | 1531444 A2 | 5/2005 |
| EP | 2187370 A1 | 5/2010 |
| EP | 2284040 A1 | 2/2011 |

OTHER PUBLICATIONS

Form PCT/ISA/206 and Annex to Form PCT/ISA/206, Communication Relating to Results of the Partial International Search, for corresponding International Application No. PCT/EP2013/074948, dated Mar. 7, 2014, 6 pages.

\* cited by examiner

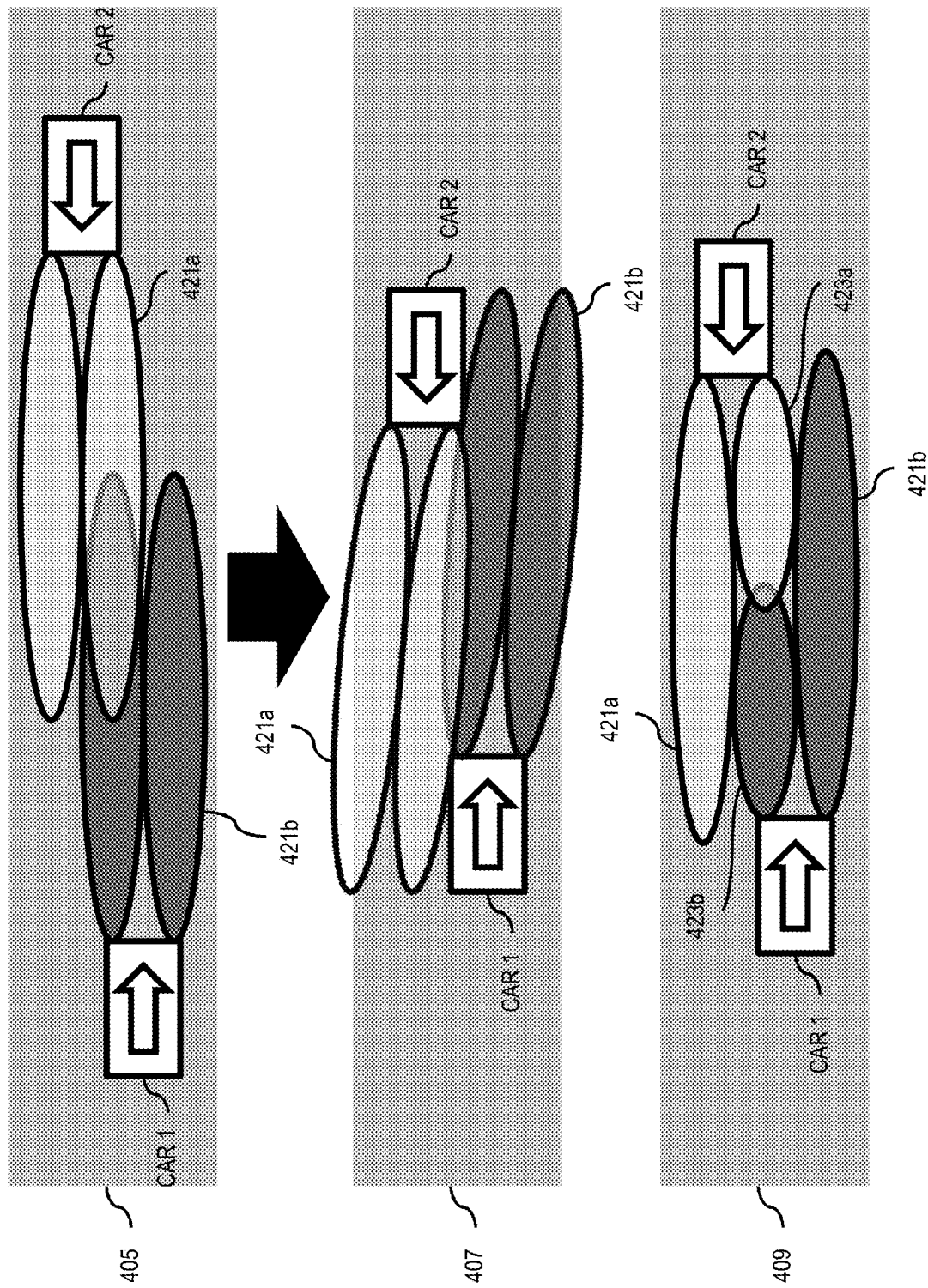

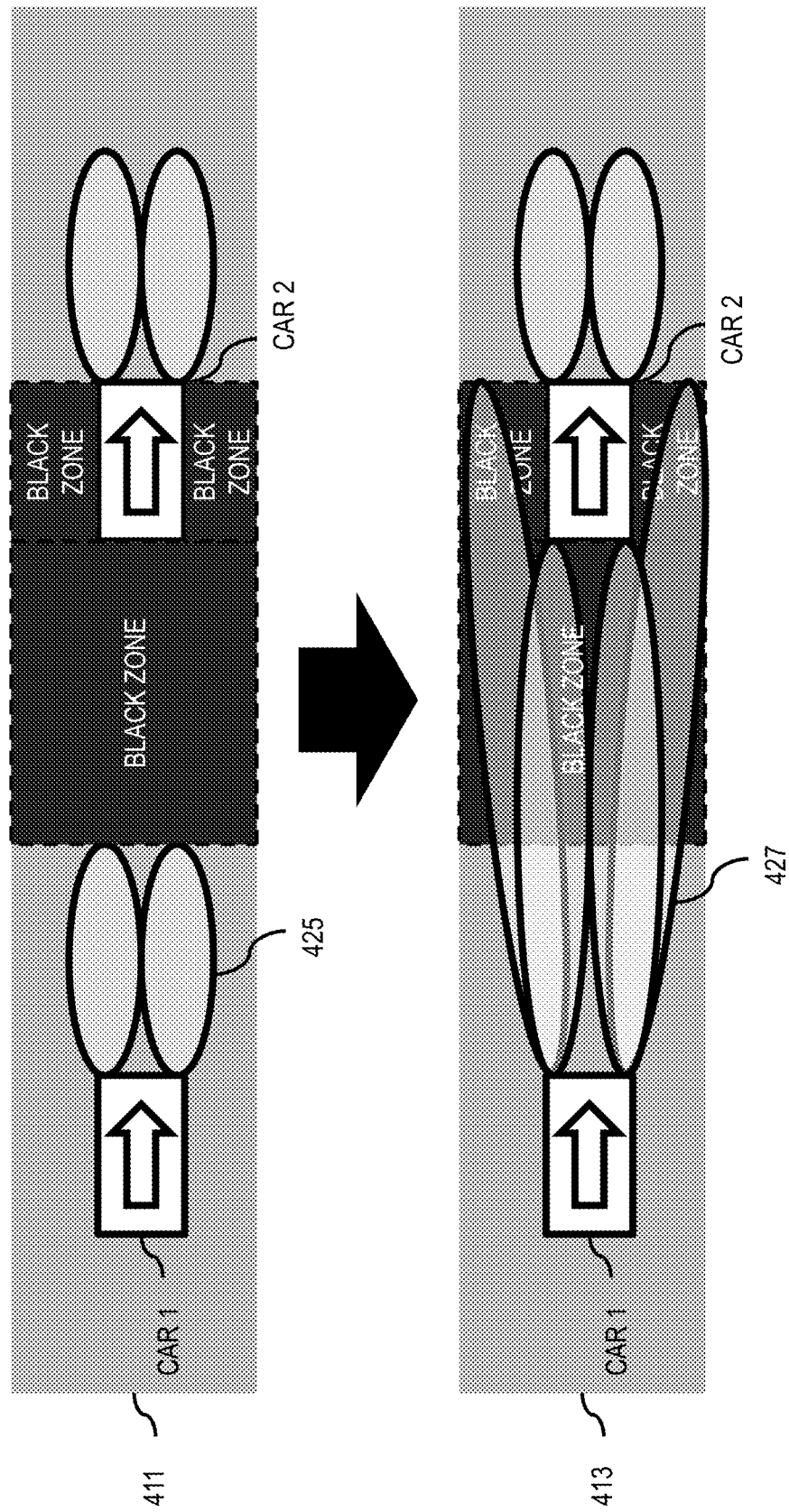

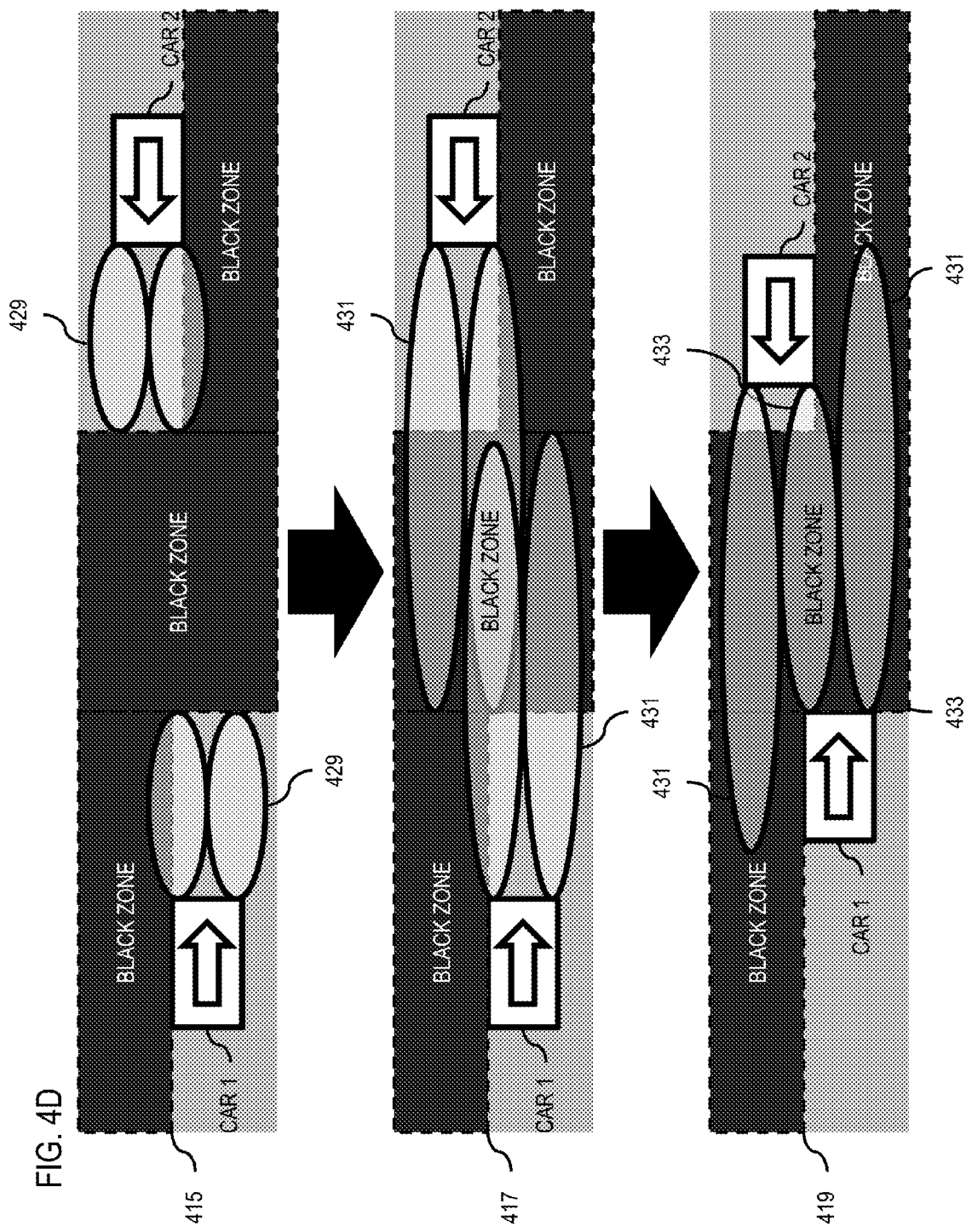

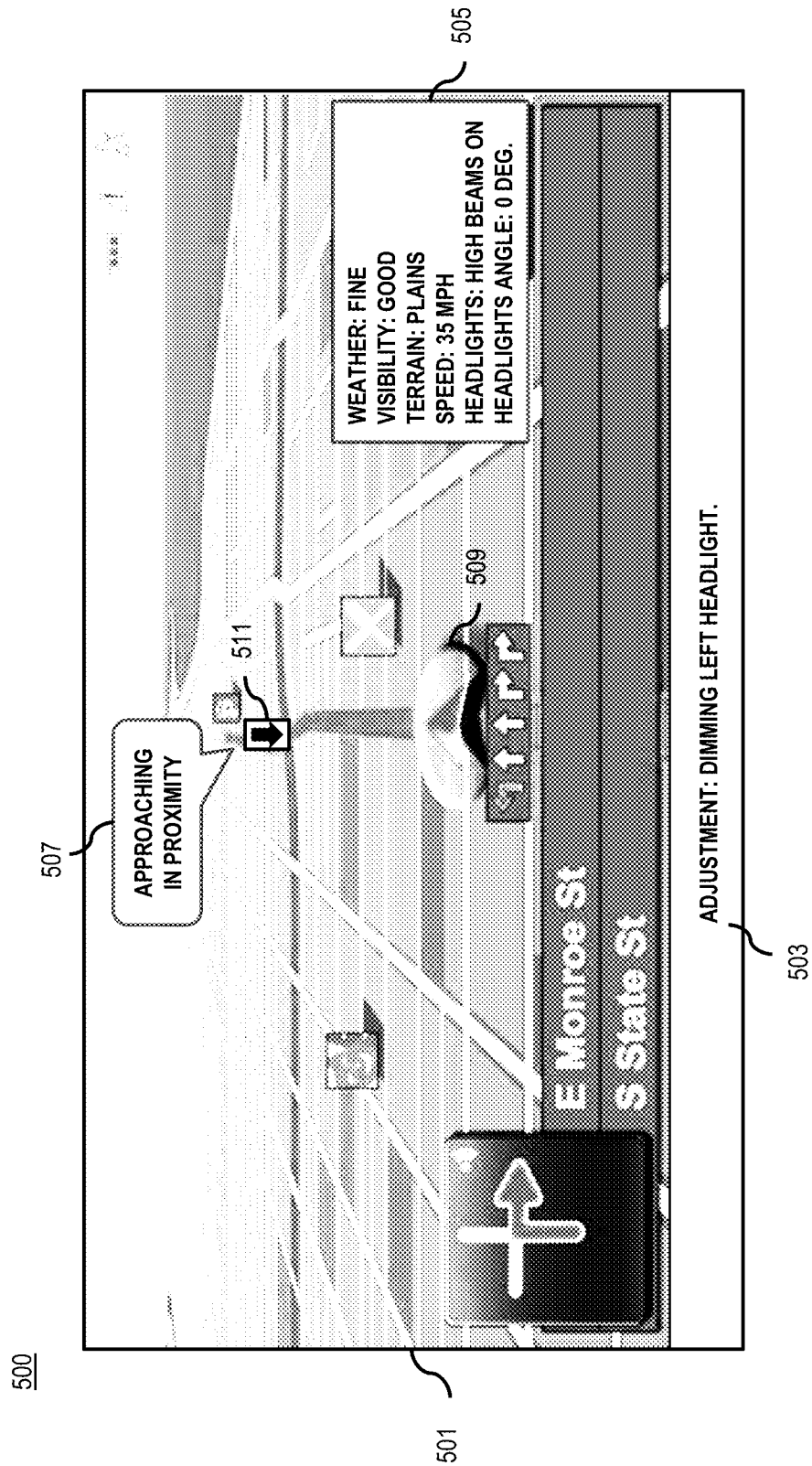

METHOD AND APPARATUS FOR CAUSING A CHANGE IN AN ACTION OF A VEHICLE FOR SAFETY

BACKGROUND

Service providers and device manufacturers (e.g., wireless, cellular, etc.) are continually challenged to deliver value and convenience to consumers by, for example, providing compelling network services. At the same time, both vehicles and motorways are becoming increasingly intelligent. In particular, communication/networking devices are being integrated into more and more vehicles and transportation infrastructure components. The integration of the communication/networking devices facilitates aggregation and sharing of real-time data/information associated with the vehicles. In the meantime, there are areas where the vehicles need improvement to further enhance the safety of the vehicles on the roads.

SOME EXAMPLE EMBODIMENTS

Therefore, there is a need for an approach for causing a change in an action of a vehicle based on real-time information associated with vehicles. According to one embodiment, a method comprises determining at least one distance between a user device and at least another user device based, at least in part, on sensor information associated with at least one of the user device and the at least another user device. The method further comprises causing, at least in part, a change in an action of at least one of the user device and the at least another user device, wherein the change in the action is based, at least in part, on the at least one distance.

According to another embodiment, an apparatus comprises at least one processor, and at least one memory including computer program code for one or more computer programs, the at least one memory and the computer program code configured to, with the at least one processor, cause, at least in part, the apparatus to determine at least one distance between a user device and at least another user device based, at least in part, on sensor information associated with at least one of the user device and the at least another user device. The apparatus is further caused to a change in an action of at least one of the user device and the at least another user device, wherein the change in the action is based, at least in part, on the at least one distance.

According to another embodiment, a computer-readable storage medium carries one or more sequences of one or more instructions which, when executed by one or more processors, cause, at least in part, an apparatus to determine at least one distance between a user device and at least another user device based, at least in part, on sensor information associated with at least one of the user device and the at least another user device. The apparatus is further caused to cause, at least in part, a change in an action of at least one of the user device and the at least another user device, wherein the change in the action is based, at least in part, on the at least one distance.

According to another embodiment, an apparatus comprises means for determining at least one distance between a user device and at least another user device based, at least in part, on sensor information associated with at least one of the user device and the at least another user device. The apparatus further comprises means for causing, at least in part, a change in an action of at least one of the user device and the at least another user device, wherein the change in the action is based, at least in part, on the at least one distance.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing a method of any of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIGS. 4A-4D are diagrams demonstrating a change in an action of a vehicle based on real-time information associated with two vehicles, according to various embodiments;

FIG. 5 is a diagram of a user interface associated with displaying a change in an action of a vehicle based on real-time information associated with vehicles, according to one embodiment;

DESCRIPTION OF SOME EMBODIMENTS

Examples of a method, apparatus, and computer program for causing a change in an action of a vehicle based on real-time information associated with vehicles are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
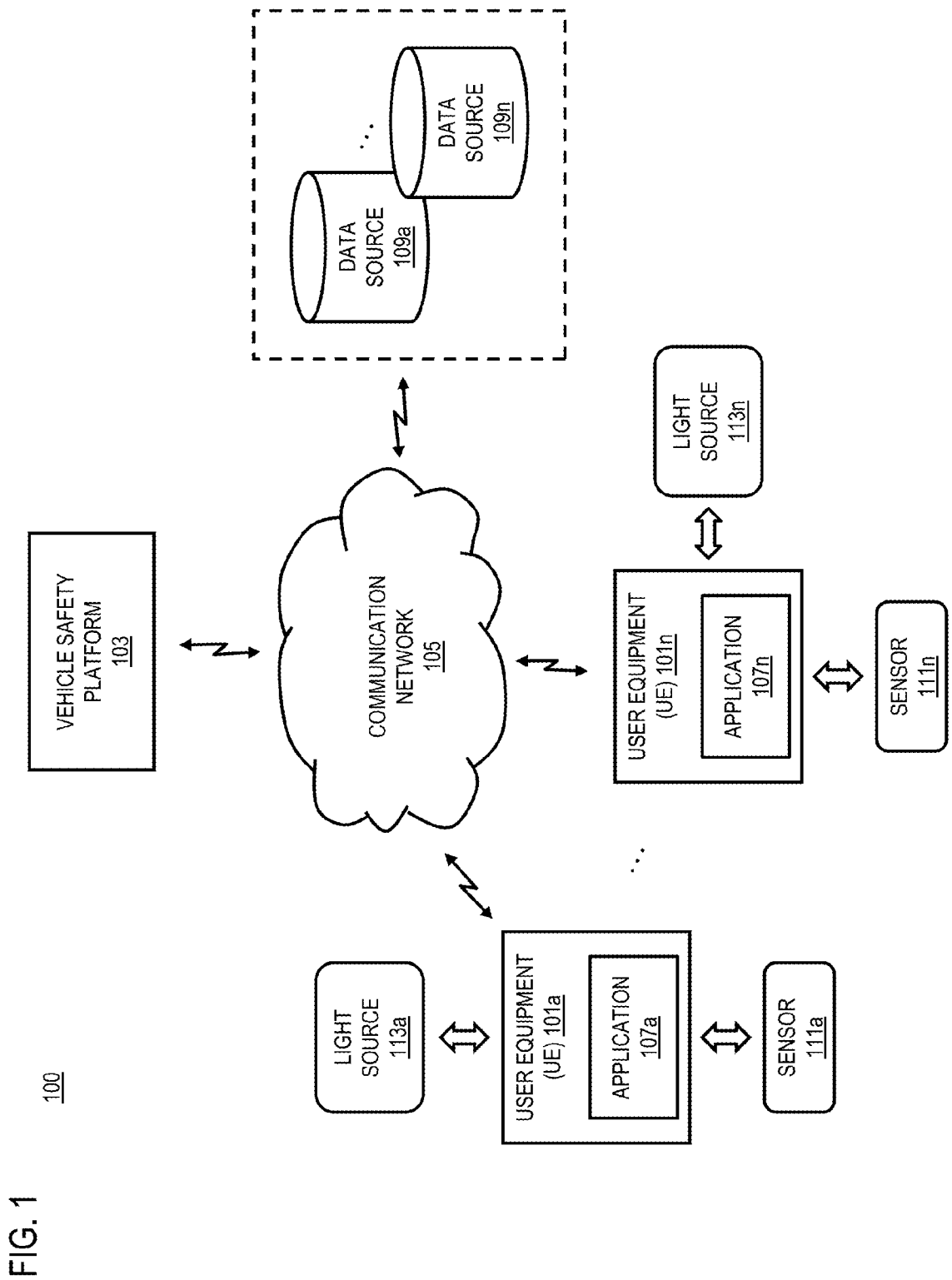
FIG. 1 is a diagram of a system capable of causing a change in an action of a vehicle based on real-time information associated with vehicles, according to one embodiment.

FIG. 1 is a diagram of a system capable of causing a change in an action of a vehicle based on real-time information associated with vehicles, according to one embodiment. Vehicles (e.g., cars, motorcycles, buses, trains, subways, etc.) and motorways (e.g., highways, railways, waterways, roadways, etc.) are becoming increasingly intelligent and communication/networking devices (e.g., GPS, GLONASS, cellular, Bluetooth®, RFID devices) are being integrated into more and more vehicles and transportation infrastructure components. The integration of the communication or network devices facilitates aggregation and sharing of real-time data/information associated with the vehicles. Yet, there are areas where the vehicles need improvement to further enhance the safety of the vehicles on the roads.

To address this problem, a system 100 of FIG. 1 introduces the capability to cause a change in an action of a vehicle based on real-time information associated with vehicles. The system 100 may comprise user equipment (UE) 101*a*-101*n* (collectively, UE 101), a vehicle safety platform 103, a communication network 105, applications 107*a*-107*n* (collectively, applications 107), data sources 109*a*-109*n* (collectively, data sources 109), sensors 111*a*-111*n* (collectively, sensors 111), and light sources 113*a*-113*n* (collectively, light source 113).

The UE 101 may be any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, vehicle, or any combination thereof, including the accessories and peripherals of these devices, or any combination thereof. It is also contemplated that the UE 101 can support any type of interface to the user (such as "wearable" circuitry, etc.). In one embodiment, the UE 101 may be embodied in one or more vehicles that are designed or used to transport passengers or cargo (e.g., cars, motorcycles, buses, trains, subways, etc., such as provided above).

The UE 101 may have connectivity to the vehicle safety platform 103 and the data source 109, via the communication network 105. By way of example, the communication network 105 of the system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof. The UE 101 may have connectivity to the sensor 111 and light source 113 via wired or wireless communication techniques (e.g., Bluetooth®, WiFi, short-range radio).

By way of example, the UE 101, the vehicle safety platform 103, and the data sources 109 may communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

The UE 101 may be associated with and/or execute the applications 107. The applications 107 may include one or more software programs installed or embedded in the UE 101. The applications 107 may provide user interfaces (UI) for user interaction with the UE 101 and/or the vehicle safety platform 103.

Further, the UE 101 may be associated with the sensors 111, which may be installed or integrated with a vehicle and/or the UE 101. By way of example, the sensors 111 may include obstacle sensors (e.g., blind spot sensors, curb sensors, parking sensors, etc.), speed sensors (e.g., accelerometers, speedometers, radar sensors, vehicle speed sensors, wheel speed sensors, etc.), environment sensors (e.g., rain sensors, snow sensors, thermometers, humidity sensors, moisture sensors, barometers, etc.), navigation sensors (e.g., altitude sensors, gyroscopic sensors, compass sensors, inclination sensors, position sensors, distance sensors, etc.), optical/light sensors, angle sensors, motion sensors, proximity sensors, etc.

Furthermore, the UE 101 may be associated with light sources 113, which may be installed or integrated with the vehicle and/or the UE 101. By way of example, the light sources 113 may include lighting and signaling devices, such as headlamps and auxiliary lamps. The headlamps may include dipped-beam (e.g., low beam, passing beam, meeting beam, etc.) headlamps, main beam (e.g., high beam, driving beam, full beam headlamps, etc.), etc. The auxiliary lamps may include front frog lamps, cornering lamps, spot lights, front position lamps (e.g., parking lamps, standing lamps, etc.), turn signals, side marker lights/reflectors, stop lamps (e.g., brake lights), etc. Further, the light sources 113 may include High Intensity Discharge (HID) lamps (e.g., xenon lamps), Light Emitting Diodes (LED) lamps, tungsten lamps, tungsten-halogen lamps, Halogen Infrared Reflective (HIR) lamps, neon lamps, etc. In one embodiment, the light sources 113 may be mounted or integrated to the front, sides, rear, and/or top of a vehicle.

The data sources 109 may include data storages or databases storing various information. The data sources 109 may store information obtained from the UE 101, the sensors 111, and the light sources 113 or other information obtained from service providers and/or content providers. The information stored in the data sources 109 may comprise sensor information, environmental information, specification information, etc. The data sources 109 may be embedded or integrated with the UE 101, the vehicle safety platform 103, or a server.

The sensor information may include any information obtained from the sensors 111. By way of example, the sensor information may include location information, speed information, angle information, etc. The location information may be detected by GPS sensors, GLONASS sensors, cellular positioning sensors, etc. The speed information may be detected by speedometers, speed sensors, wheel speed sensors, vehicle speed sensors, etc. The angle information may be detected by tire angle sensors, steering angle sensors, vehicle angle sensors, etc.

The environmental information may include any information about surroundings of the UE 101. By way of example, the environmental information may include terrain information, weather information, structural information, or a combination thereof. The terrain information may include information about the lay of the land in terms of the elevation, slope, orientation, etc. of terrain features. The weather information may include information about the state of the atmosphere to the degree that is hot or cold, wet or dry, calm or stormy, clear or cloudy in terms of temperature, humidity, atmospheric pressure, wind, precipitation, etc. The structural information may include information about physical structures of man-made or natural arrangements, such as buildings, mountains, tunnels, parking lots, mountains, etc.

The specification information may include any information about the light sources 113. By way of example, the specification information may include a radius, an angle functionality, etc. of the light sources 113. The radius may include a radius of a lamp or a light bulb of the light sources 113. The angle functionality may include possible adjustments of the light sources 113 in various angles. The specification information may also include a type of the light sources 113 (e.g., HID, LED, HIR, halogen, tungsten, tungsten-halogen, neon, etc.), a degree of brightness, a potential coverage (e.g., distance, area, etc.), a maximum and/or minimum temperature, etc. of the light sources 113. Specification information may be received from the light sources 113 by the UE 101 and stored in the data sources 109.

In one embodiment, the system 100 may determine the sensor information, the environmental information, or a combination thereof associated with at least one vehicle equipped with the at least one light source 113a. By way of example, the UE 101 may request the vehicle safety platform 103 to determine the sensor information, the environmental information, or a combination thereof. The vehicle safety platform 103 may receive a request from the UE 101 to determine the sensor information, environmental information, or a combination thereof and then request from the data sources 109 the sensor information, the environmental information, or a combination thereof.

In one embodiment, the system 100 may determine specification information of the at least one light source 113a. By way of example, the UE 101 may request the vehicle safety platform 103 to determine the specification information. The vehicle safety platform 103 may receive the request from the UE 101 to determine the specification information. The vehicle safety platform 103 may request the data source 109 for the specification information.

In one embodiment, the system 100 may cause, at least in part, a change in an action of the at least one light source 113a based, at least in part, on the sensor information, the environmental information, the specification information, or a combination thereof. By way of example, the vehicle safety platform 103 may determine a distance between a user vehicle associated with a UE 101a and another vehicle associated with another UE 101b based on the sensor information received from the UE 101a and the other UE 101b. The vehicle safety platform 103 may also determine environmental factors that may affect driving conditions based on the environmental information. The vehicle safety platform 103 may further determine functionality information and compatibility information of the light sources 113 based on the specification information, wherein the specification information may be used in generating instructions for operation of the light sources 113. Then, the vehicle safety platform 103 may, by providing the instructions to the UE 101, cause the light sources 113 to operate in compliance with the predetermined rules based on one or more of the distance, the environmental factors, the functionality information, the compatibility information, etc.

In one embodiment, the change in the action may include a tilting, a dimming, a brightening, and/or a turning on/off of the light sources 113. By way of example, when two vehicles are approaching each other in close proximity and the outside is bright enough to recognize each other with less lighting, the light sources 113 may be dimmed and/or tilted in a different angle to prevent dazzling the driver. After the vehicles pass each other, the light sources 113 may be tiled back to the original position/angle and/or brightened back to the normal brightness.

In one embodiment, the system 100 may determine at least one distance between a first device (e.g., UE 101a) associated with the at least one vehicle and a second device (e.g., UE 101b) associated with at least one other vehicle based, at least in part, on the sensor information associated with the first device and the second device. By way of example, the distance between the first device and the second device may be determined based on the GPS, GLONASS, or cellular location information of the first device and the second device. Also, the change in the action of the light sources 113 may be based on the distance between the first device and the second device. The light sources 113 associated with the first device or the second device may be dimmed or tilted in a different angle.

In one embodiment, the system 100 may determine that at least two vehicles are on a collision path based, at least in part, on the at least one distance between the two vehicles. For example, when the distance between a first device and a second device is determined to be very close or within a predetermined collision distance, the potential collision of a first vehicle with a second vehicle may be determined. The determination of the potential collision may be also based on speed information and directional information of the two devices. As the distance between the two devices is shorter and the speeds of the devices are faster, a higher chance of the potential collision may be determined.

In one embodiment, the system 100 may cause, at least in part, a presentation of a notification that the at least two vehicles are on a collision path. By way of example, when the potential collision is determined, a sound alert, a pop-up message, a warning sign, etc. may be presented on the UE 101. The sound alert may be played through speakers of the UE 101 or one or more of the at least two vehicles. The pop-up message or the warning sign may be displayed on the UE 101 via the UI.

In one embodiment, the system 100 may cause, at least in part, a presentation of a notification based, at least in part, on the sensor information, the environmental information, or a combination thereof. By way of example, the notification may include a message, a warning, or an alert. The notification may inform the environmental information, such as surrounding structures, terrains, weathers, etc. and/or the sensor information, such as speed of the vehicle, distance between two vehicles, direction of the vehicle, etc. Further, the notification may contain information about the current status of the light sources 113, such as whether the light sources 113 have tilted, dimmed, turned on/off, or returned to the original position, etc.

In one embodiment, the system 100 may determine that a first device associated with the at least one vehicle and a second device associated with at least one other vehicle are heading in same direction, wherein the second device is behind the first device in the same direction. Further, the system 100 may cause, at least in part, the change in the action of the at least one light source 113a associated with the second device. By way of example, as the one vehicle approaches the other vehicle in a same direction on a road, the main beam lights from the one vehicle would hit the mirrors of the other vehicle and the driver of the other vehicle would be dazzled by the reflected lights. In this case, the vehicle safety platform 103 may determine that the one vehicle is approaching the other vehicle in close proximity in a same direction on a same road and cause a change in the action of the light source 113a of the one vehicle by dimming the headlights so that the headlights do not dazzle the driver of the other vehicle.

In one embodiment, the system 100 may determine that a first device associated with the at least one vehicle and a second device associated with the at least one other vehicle are heading in an opposing direction (e.g., towards each other). In which case, the vehicle safety platform 103 may cause, at least in part, a change in an action of at least one light source associated with the first device and/or the second device. By way of example, as one vehicle and another vehicle approach each other from opposite directions on the same road, the main beam lights from the vehicles would hit the drivers of opposite vehicles, thereby dazzling the drivers. In this case, the vehicle safety platform 103 may determine that the one vehicle and the other vehicle are approaching each other from opposite directions on the same road and cause a change in the action of the light sources 113 of vehicles by tilting the headlights away from the opposite vehicle and/or dimming the headlights so that the lights do not dazzle the drivers of the vehicles.

In one embodiment, when the UE 101 associated with a first vehicle loses connectivity to the vehicle safety platform 103, the most recent information (e.g., location, speed, direction, etc.) associated with the first vehicle may be available in the UE 101 or the vehicle safety platform 103. Based on the most recent information of the first vehicle, the location where the first vehicle and the second vehicle could encounter can be determined. For example, when a first car approaching a second car suddenly loses connection, the last position, speed, direction, etc. of the first car may be received from the vehicle safety platform 103 by the second car. Based on the last position, the speed, the direction, etc. of the first car, the vehicle safety platform 103 or the second car may calculate the location where the first car may encounter the second car. Also, the first car can calculate the encounter location based on the most recent information of the first car or the second car that is available locally in the first car.

In one embodiment, when the vehicle safety platform 103 determines that a UE 101a and/or a vehicle associated with the UE 101a approaches a tunnel based on the environmental information and/or location information of the UE 101, the vehicle safety platform 103 may cause the sensor 111 to be ready for detecting surrounding information (e.g., amount of lights in the tunnel). When the UE 101 and/or the vehicle enters the tunnel, an amount of light surrounding the vehicle may be detected by the sensor 111 (e.g., light detecting sensor) and the sensor information may be used to adjust (e.g., brighten or dim) an associated light source 113a based on the brightness or the darkness of the tunnel. Further, by determining the location of other vehicles (e.g., also in the tunnel), the vehicle safety platform 103 can adjust the light sources 113 of one or more of the vehicles based on the presence of other vehicles within the tunnel. By way of example, for a long line of vehicles traveling in the same direction, the vehicle safety platform 103 may cause the light sources 113 of the vehicle in front to be bright (e.g., high beams) while the remaining vehicles may have their light sources 113 set on normal or low (e.g., low beams). Further, although the tunnel may be dark such that light sensors associated with a vehicle alone may cause the light sources 113 to be bright (e.g., high beams), the vehicle safety platform 103 may override the light sources 113 if the vehicle safety platform 103 detects, for example, two vehicles approaching from opposite directions. As the vehicles approach, the vehicle safety platform 103 may cause the light sources 113 to switch from high beam to low beam as the combined brightness from the light sources 113 of both vehicles on low beam may be sufficient for the drivers of vehicles to travel through the tunnel without blinding each other.

Figure 2:
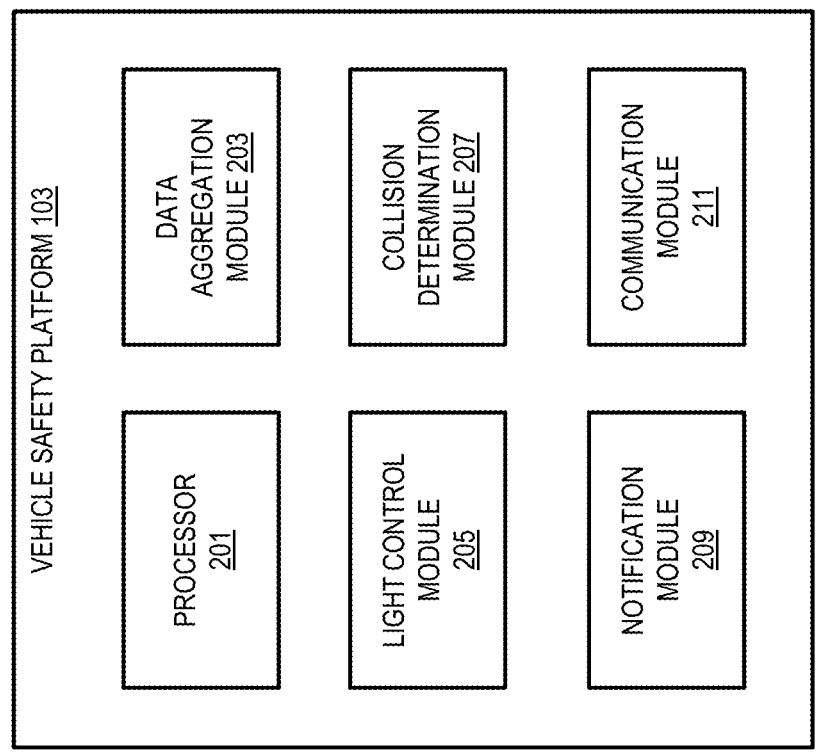
FIG. 2 is a diagram of the components of a vehicle safety platform, according to one embodiment.

FIG. 2 is a diagram of the components of the vehicle safety platform 103, according to one embodiment. By way of example, the vehicle safety platform 103 includes one or more components for causing a change in an action of a vehicle based on real-time information associated with vehicles. It is contemplated that the functions of these components may be combined in one or more components or performed by other components of equivalent functionality. In this embodiment, the vehicle safety platform 103 includes a processor 201, a data aggregation module 203, a light control module 205, a collision determination module 207, a notification module 209, and a communication module 211. In one embodiment, the vehicle safety platform 103, which may be implemented on a server, including the light control module 205 and/or the collision determination module 207, may operate in the background without any specific request from the UE 101 once the UE 101 is connected and/or associated with the vehicle safety platform 103.

In one embodiment, the processor 201 may perform data/information processing for other components (e.g., the data aggregation module 203, the light control module 205, the collision determination module 207, the notification module 209, and the communication module 211, etc.) of the vehicle safety platform 103. For example, the processor 201 may determine or process the sensor information, the environmental information, the specification information, etc. to determine the locations of the UE 101, necessary adjustments in the action of the light sources 113, functionality, status of the light sources 113, etc.

In one embodiment, the data aggregation module 203 may aggregate data/information used by the other components of the vehicle safety platform 103. The data aggregation module 203 may aggregate the data/information from the data sources 109. The data aggregation module 203 may also aggregate the data/information from other sources, such as the sensors 111, the UE 101, information services, etc. For example, the UE 101 may request the vehicle safety platform 103 to check for an approaching vehicle that may be affected by the user vehicle's headlights. Then, the data aggregation module 203 may access the data sources 109 or the other sources to aggregate location information of the vehicles in proximity. Upon detecting an approaching vehicle in proximity, the vehicle safety platform 103 may access the data sources 109 or the other sources to aggregate the sensor information, the environmental information, the specification information, etc. to determine a necessary change of the action of the light sources 113 of one or more user vehicles.

In one embodiment, the light control module 205 may control the actions of the light sources 113. The light control module 205 may send a request, an instruction, or a signal to the light sources 113 based on a determination of a change of an action for the light sources 113. The request, the instruction, or the signal may cause a change in the action of the light sources 113, such as tilting, dimming, turning on/off, etc. Further, the light control module 205 may constantly, periodically, and/or on demand check for the status of the light sources 113 and may inform users of any changes, errors, and/or malfunctions of the light sources 113. For example, after the processor 201 determines that one or more light sources 113 need to be adjusted to avoid dazzling another driver, the light control module 205 may send to the light sources 113 the request, the instruction, or the signal to change the action of the light sources 113.

In one embodiment, the collision determination module 207 may determine the potential collision of a user vehicle with another vehicle based on predetermined collision factors. The predetermined collision factors may include a distance between the user vehicle and the other vehicle, weather conditions, speeds of both vehicles, directions of both vehicles, etc. For example, the collision determination module 207 may request sensor information, environmental information, etc. from the data aggregation module 203. The collision determination module 207 may process the sensor information, the environmental information, etc., by the processor 201, based on the predetermined collision factors to determine a potential collision of the user vehicle with the other vehicle. Upon determining the potential collision, the collision determination module 207 may send the potential collision information to the notification module 209 such that the notification module 209 can generate a notification of the potential collision. In one embodiment, the determination of the potential collision may be utilized by the light control module 205 in adjusting the light sources 113. For example, upon determination of the potential collision by the collision determination module 207, the light control module 205 may cause the headlights to flash in a way to warn the approaching vehicle or surrounding vehicles (e.g., high beams, blinking/flashing beams, colored beams, etc.).

In one embodiment, the notification module 209 may generate a notification to be presented on the UE 101 through the UI. The notification may be generated in forms of a warning, an alert, a message, etc. Also, the notification may be a permanent notification, a constant notification, or an instant notification. The notification module 209 may receive notification information from the other components of the vehicle safety platform 103 (e.g., the data aggregation module 203, the light control module 205, the collision determination module 207, and the communication module 211, etc.). The notification module 209 may generate a notification or notify information based on the sensor information, the environmental information, the specification information, etc. The notification module 209 may also generate a notification or notify information about current status or a change in the action of the light source 113. The notification module 209 may further generate a notification or notify information regarding a possible collision. For example, when the vehicle safety platform 103 determines, by the processor 201, that a change in the action of the light sources 113 is necessary and that a collision with another vehicle is possible, the notification module 209 may generate one notification message informing the current change in the action of the light sources 113 and another notification message informing the potential collision of the user vehicle with the other vehicle. The generated message may be sent to the UE 101 and displayed via the UI.

The communication module 211 may implement various communications between the vehicle safety platform 103 and other elements of the system 100 and/or module within the vehicle safety platform 103, as discussed above. By way of example, the communication module 211 may communicate with one or more UE 101 to change one or more actions of light sources 113 associated with the UE 101. The communication module 211 may also communication with one or more sensors 111 associated with the UE 101 to gather sensor information for the vehicle safety platform 103 to process. The communication module 211 may further communicate with the data sources 109 for gather information to provide to the vehicle safety platform 103 and/or the UE 101.

Figure 3A:
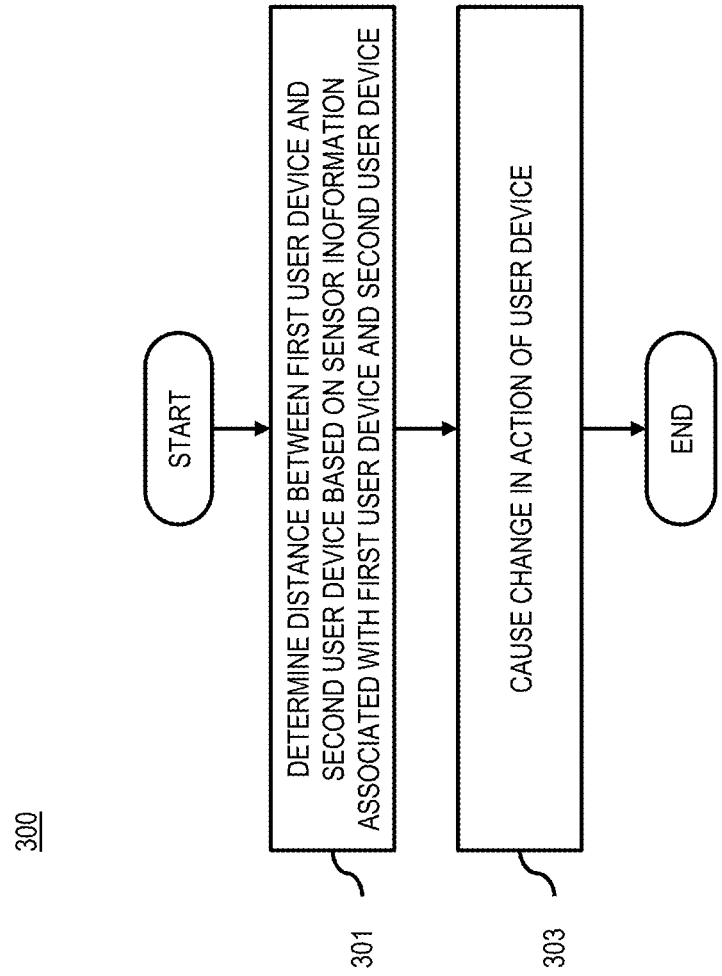
FIGS. 3A-3C are flowcharts of processes for causing a change in an action of a vehicle based on real-time information associated with vehicles, according to various embodiments.
Figures 3B, 3C:
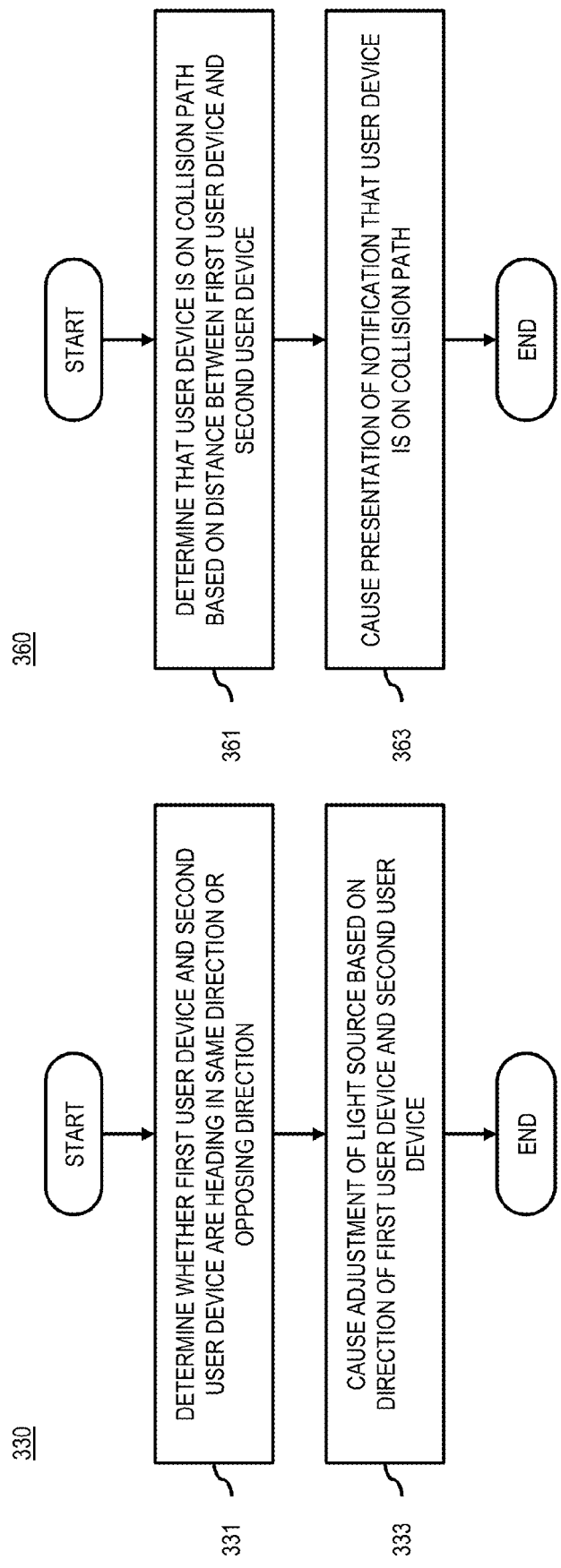
Figure 7:
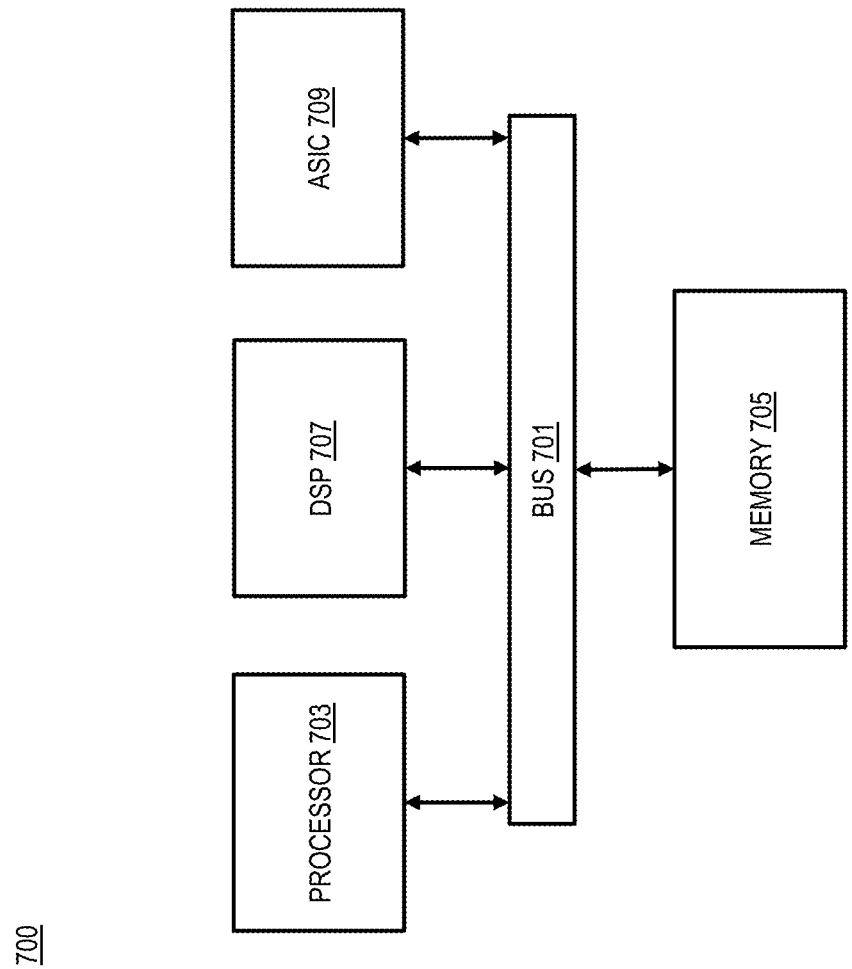
FIG. 7 is a diagram of a chip set that can be used to implement an embodiment of the invention.

FIGS. 3A-3C are flowcharts of processes for causing a change in an action of a vehicle based on real-time information associated with vehicles, according to various embodiments. In various embodiments, the vehicle safety platform 103 may perform the processes 300, 330 and 360 and may be implemented in, for instance, a chip set including a processor and a memory as shown in FIG. 7. As discussed above, one or more of the processes 300, 330, and 360 may be executed by the vehicle safety platform 103 automatically, such as without any specific request from the UE 101, users associated with the UE 101, any vehicles associated with the UE 101, or a combination thereof one the UE 101 and/or vehicles associated with the UE 101 are connected to and/or associated with the vehicle safety platform 103.

FIG. 3A is a flowchart of a process 300 for causing a change in an action of a vehicle based on real-time information associated with vehicles, according to one embodiment. In one embodiment, the vehicle safety platform 103 may determine at least one distance between a first user device and a second user device (or more, such as one or more other user devices) based, at least in part, on the sensor information associated with the first user device and the second user device (Step 301). In one embodiment, the vehicle safety platform 103 may determine sensor information associated with the first user device and the second user device when, for example, a UE 101a requests the vehicle safety platform 103 to check the safety of the vehicle associated with the UE 101a. Then, the vehicle safety platform 103 may determine the sensor information associated with the vehicle and other vehicles in a range. The vehicle safety platform 103 may request or access the UE 101 or data sources 109 for the sensor information. In one embodiment, the sensor information may include location information, speed information, angle information, or a combination thereof. For example, the location information may be detected by GPS sensors, GLONASS sensors, cellular positioning sensors, etc. The speed information may be detected by speedometers, speed sensors, wheel speed sensors, vehicle speed sensors, etc. The angle information may be detected by tire angle sensors, steering angle sensors, vehicle angle sensors, etc. Based on the received information, the vehicle safety platform 103 may determine the distance between the first user device and the second user device. By way of example, the distance may be calculated based on location information of the first user device and the second user device, wherein the location information may be detected by GPS, GLONASS, or cellular positioning sensors associated with the first user device and the second user device.

Furthermore, the vehicle safety platform 103 may cause, at least in part, a change in an action of the first user device and/or the second user device, wherein the change in the action is based, at least in part, on the at least one distance (Step 303). In one embodiment, the change in the action may include an adjustment of at least one light source associated with the first user device and/or the second user device. In one embodiment, the adjustment may include, at least in part, a tilting, a dimming, a brightening, a turning on/off, or a combination thereof of the at least one light source. For example, the vehicle safety platform 103 may cause a dimming, a brightening, a tilting, etc. of the light source 113 associated with the at least one user device when the distance between the first user device and the second user device is within a predetermined range. In one embodiment, the change in the action may include a presentation of a collision warning associated with the first user device and/or the second user device. For example, the vehicle safety platform 103 may cause a displaying of a collision warning message on a user interface associated with the first user device when the distance between the first user device and the second user device is within a predetermined range.

FIG. 3B is a flowchart of a process 330 for causing an adjustment of a light source associated with a vehicle based on real-time information associated with vehicles, according to one embodiment. In one embodiment, the vehicle safety platform 103 may determine whether the first user device and the second user device are heading in the same direction or an opposing direction (Step 331). Further, the vehicle safety platform 103 may cause, at least in part, the adjustment of the at least one light source based, at least in part, on the direction of the first user device and the second user device (Step 333). Examples of the process 330 are described in regard to FIGS. 4A-4C below.

FIG. 3C is a flowchart of a process 360 for causing a presentation of a notification associated with a vehicle based on real-time information associated with vehicles, according to one embodiment. In one embodiment, the vehicle safety platform 103 may determine that a first user device and a second user device are on a collision path based, at least in part, on the at least one distance between the first user device and the second device (Step 361). For example, when the distance between the first device and the second device is determined to be very close or within a predetermined collision distance, the potential collision of the first vehicle with the second vehicle may be determined as possible. The determination of the potential collision may be also based on speed information and directional information of the two devices. As the distance between the two devices is shorter and the speeds of the devices are faster, a higher chance of the potential collision may be determined. In one embodiment, the vehicle safety platform 103 may utilize the determination of the potential collision in adjusting the light source 113. For example, upon determination of the potential collision, the vehicle safety platform 103 may cause the headlights to flash in a way to warn the approaching vehicle or surrounding vehicles (e.g., high beams, blinking/flashing beams, colored beams, etc.).

Further, the vehicle safety platform 103 may cause, at least in part, the presentation of the notification that the at least one user device is on the collision path (Step 363). For example, when the potential collision is determined, a sound alert, a pop-up message, a warning sign, etc. may be presented on the UE 101. The sound alert may be played through speakers of the UE 101 or the first vehicle. The pop-up message or the warning sign may be displayed on the UE 101 via the UI. In that way, the vehicle safety platform 103 can present a notification of a vehicle being on a collision path.

In one embodiment, the vehicle safety platform 103 may cause a presentation of a notification that the first vehicle is on a collision path with the second vehicle to the UE 101 other than the UE 101 associated with the first vehicle and the second vehicle. For example, determining that the first vehicle is on a collision path with the second vehicle, the vehicle safety platform 103 may notify other UE 101 associated with other nearby vehicles about the collision or possible collision between the first vehicle and the second vehicle. In that way, the other vehicles nearby of the collision can prepare for or avoid the collision.

In one embodiment, the vehicle safety platform 103 may cause a presentation of a notification based on the sensor information and/or the environmental information. For example, the notification may include a message, a warning, or an alert. The notification may inform a user of the environmental information (e.g., surrounding structures, terrains, weathers, etc.) or the sensor information (e.g., speed of the vehicle, distance between two vehicles, direction of the vehicle, etc.). Further, the notification may contain information about the current status of light sources 113 such as whether the light sources 113 have tilted, dimmed, turned on/off, or returned to the original position, etc.

In one embodiment, the change in the action may be based on environmental information, specification information, or a combination thereof associated with the at least one user device. For example, environmental information may include terrain information, weather information, structural information, or a combination thereof, and the specification information may include a radius, an angle, functionality, or a combination thereof of at least one light source 113 associated with the at least one user device. For example, the vehicle safety platform 103 may determine environmental factors that may affect driving conditions based on the environmental information (e.g., degree of darkness, weather condition, surrounding structures, etc.). The vehicle safety platform 103 may further determine functionality information and compatibility information of the light sources 113 based on the specification information, wherein the specification information may be used in generating instructions for operation of the light sources 113. Then, the vehicle safety platform 103 may, by providing the instructions to the UE 101, cause the light sources 113 to operate in compliance with the predetermined rules based on the distance, the environmental factors, the functionality information, the compatibility information, etc. In that way, the vehicle safety platform 103 can change the action of vehicle lights (e.g., light sources).

Figure 4A:
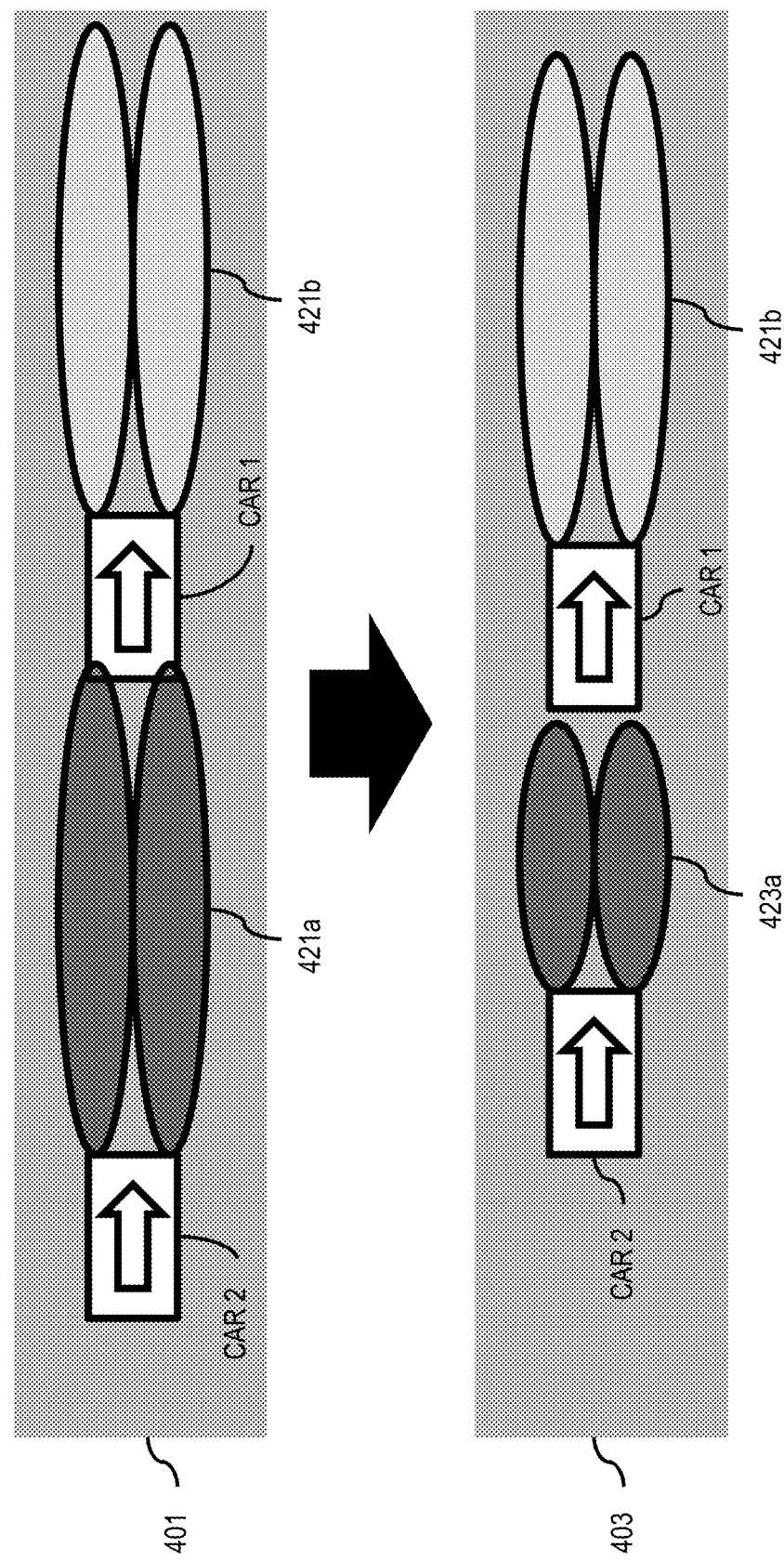

FIGS. 4A-4D are diagrams demonstrating a change in an action of a vehicle based on real-time information associated with vehicles, according to various embodiments; FIG. 4A is a diagram demonstrating a change in the action of the light source associated with the second vehicle, according to one embodiment. In one embodiment, the vehicle safety platform 103 may determine that the first device associated with the first vehicle and second device associated with second vehicle are heading in a same direction, wherein the second device is behind the first device in the same direction (as discussed with respect to Step 331 of FIG. 3B). Further, the vehicle safety platform 103 may cause the change in the action of the light sources 113b associated with the second vehicle and the second device (as discussed with respect to Step 333 of FIG. 3B).

For example, as CAR 2 approaches CAR 1 in the same direction along a road (as shown in scene 401 of FIG. 4A), the high beams 421a from CAR 2 would hit, for example, the mirrors of CAR 1 (which may or may not also have high beams 421b) and the driver of the CAR 1 would be dazzled by the reflected lights from the high beams 421a. In this case, the vehicle safety platform 103 determines that CAR 2 is approaching CAR 1 in close proximity and in the same direction on the same road and causes a change in the action of the high beams 421a (e.g., light sources 113) of CAR 2 by dimming the light sources 113 such as by switch to low beams 423a (as shown in scene 403) so that the light sources 113 do not dazzle the driver of CAR 1. In that way, the vehicle safety platform 103 can change the action of the light sources 113 of the second vehicle when the second vehicle approaches the first vehicle in close proximity and in the same direction along the same road.

FIG. 4B is a diagram demonstrating the changes in the action of the light source associated with the first vehicle and the second vehicle, according to one embodiment. In one embodiment, the vehicle safety platform 103 may determine that the first device associated with the first vehicle and the second device associated with the second vehicle are heading in opposing directions (as discussed with respect to Step 331 of FIG. 3B)). Further, the vehicle safety platform 103 may cause the change in the action of the light sources 113 associated with the first device and the second device (as discussed with respect to Step 333 of FIG. 3B).

For example, as CAR 1 and CAR 2 approach each other from opposite directions on the same road (as shown in scene 405 of FIG. 4B), the high beams 421b and 421a, respectively, from CAR 1 and CAR 2 would hit the drivers of CAR 1 and CAR 2 and the drivers would be dazzled by the lights. In this case, the vehicle safety platform 103 determines that CAR 1 and CAR 2 are approaching each other on the same road and causes a change in the action of the light sources 113 of CAR 1 and CAR 2 by tilting the high beams 421a and 421b (e.g., light sources 113) away from the opposite vehicle (as shown in scene 407) or by dimming the headlights (as shown in a scene 409) so that the lights would not dazzle the drivers of CAR 1 and CAR 2. In one embodiment, the vehicle safety platform 103 may dim both light sources 113 on both CAR 1 and CAR 2, such as by switching the light sources 113 to low beams. In one embodiment, as illustrated in scene 409, the vehicle safety platform 103 may switch only the light sources 113 on adjacent sides of CAR 1 and CAR 2 to low beam and leave the light sources 113 on opposite sides of CAR 1 and CAR 2 to remain high beam. In that way, the vehicle safety platform can change the action of the light sources 113 when the first vehicle and the second vehicle are approaching each other from opposite directions.

In one embodiment, the vehicle safety platform 103 may determine a dark or non-illuminated area (so called "Black Zone") between two approaching vehicles (in same direction or opposite directions) based on locations of the two vehicles. The Black Zone may include sides and backs of the vehicles. Then, the vehicle safety platform 103 may cause an adjustment to the light source 113 based on the speed of the vehicles, the area of the Black Zone, current brightness/length of the light source, etc.

FIG. 4C is a diagram demonstrating the changes in the action of the light source 113 in regard to non-illuminated area ("Black Zone") between the first vehicle and the second vehicle, according to one embodiment. For example, when the two cars (e.g., CAR 1 and CAR 2) are traveling in the same direction with normal brightness of the headlights (e.g., light sources 113), the Black Zone (e.g., sides and back of CAR 1) exists between the two cars (as shown in a scene 411). The Black Zone may be determined based on the locations of CAR 1 and CAR 2 and the brightness/length of the light beam 425 of CAR 1. Upon determining that the Black Zone exists between the two vehicles, the headlights may be adjusted (e.g., tilted, brightened/lengthened, or both) to generate a modified light beam 427 to cover the Black Zone (as shown in a scene 413), thereby eliminating the Black Zone (e.g., sides and back of CAR 1) and broadening the sight of the drivers.

FIG. 4D is a diagram demonstrating the changes in the action of the light sources 113 in regard to a non-illuminated area surrounding the first vehicle and the second vehicle, according to one embodiment. For example, when the two cars (CAR 1 and CAR 2) are approaching each other from opposite directions with normal brightness of the headlights, the Black Zone exists in the area between the two cars and on sides of the cars (as shown in a scene 415). The Black Zone may be determined based on the locations, speeds, brightness and/or length of the light beams, etc. of CAR 1 and CAR 2. Upon determining that the Black Zone exists, the headlights may be adjusted (e.g., brightened or lengthened), such as by turning on high beams, to cover the Black Zone (as shown in a scene 417), thereby eliminating the Black Zone surrounding the two vehicles and broadening the sight of the drivers. Further, although the vehicle safety platform 103 may adjust the headlights of CAR 1 and CAR 2 to illuminate the Black Zone, as the cars continue to approach each other, to avoid shining the light from the light sources 113 in the eyes of the driver, the vehicle safety platform 103 may again change the light sources 113 by, for example, dimming the light sources 113 of CAR 1 and CAR 2 on adjacent sides (as indicated by low beams 433 in scene 419) while maintaining the brightness of the light sources 113 on opposite sides (as indicated by the high beams 431 in scene 419). Under this approach, the vehicle safety platform 103 can maximize safety by reducing the Black Zone while also reducing dazzle caused by the light sources 113 of the oncoming cars shining in the drivers eyes.

FIG. 5 is a diagram of a user interface (UI) 500 utilized by the UE 101 in providing an adjustment of vehicle lights and a presentation of collision warning, according to one embodiment. The UI 500 may be displayed on the UE 101 (e.g., mobile phone, navigation system, vehicle head-up display, etc.). For example, the UI 500 may include a navigation/mapping layout 501, a status/notification bar 503, an information box 505, a pop-up notification 507, an icon of the user's vehicle 509, an icon of the other vehicle 511, etc. The navigation/mapping layout 501 may provide general navigation/mapping information to the user. The status/notification bar 503 may display information regarding the current status or a change in the action of the light source 113. The status/notification 503 bar may also display warnings (e.g., possible collision warning) or other important information. The information box 505 may display the sensor information and/or the environmental information that may be useful for the user to know. The user may customize the information to be included in the information box 505. The pop-up notification 507 may present an instant message that needs the user's quick attention. The icon of the user's vehicle 509 and the icon of the other vehicle 511 may indicate the locations of the vehicles on the map. According to an exemplary scenario in FIG. 5, the UI 500 presents, on the navigation/mapping layout 501, that the other vehicle 511 is approaching in close proximity to the user vehicle 509. By the pop-up notification 507 ("Approaching in Proximity"), the UI 500 instantly informs the user that the other vehicle 511 is approaching to the user vehicle 509 in close proximity. Also, the status/notification bar 503 informs a current adjustment of the headlight ("Dimming Left Headlight"). Further, the information box 505 indicates current weather, visibility, terrain, speed of the vehicle, and status of the headlights.

The processes described herein for causing a change in an action of a vehicle based on real-time information associated with vehicles may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 6:
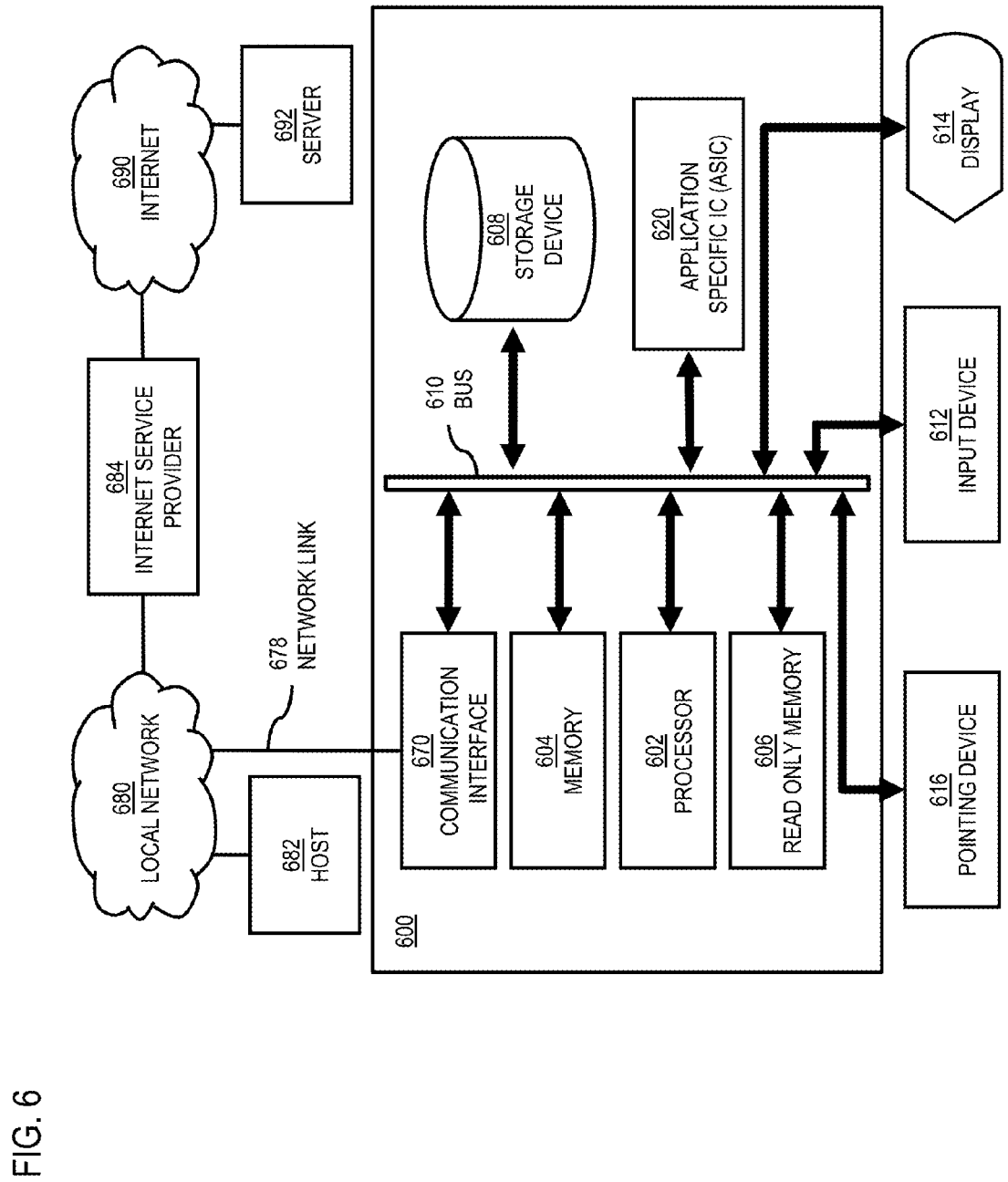
FIG. 6 is a diagram of hardware that can be used to implement an embodiment of the invention.

FIG. 6 illustrates a computer system 600 upon which an embodiment of the invention may be implemented. Although computer system 600 is depicted with respect to a particular device or equipment, it is contemplated that other devices or equipment (e.g., network elements, servers, etc.) within FIG. 6 can deploy the illustrated hardware and components of system 600. Computer system 600 is programmed (e.g., via computer program code or instructions) to cause a change in an action of a vehicle based on real-time information associated with vehicles as described herein and includes a communication mechanism such as a bus 610 for passing information between other internal and external components of the computer system 600. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 600, or a portion thereof, constitutes a means for performing one or more steps of causing a change in an action of a vehicle based on real-time information associated with vehicles.

A bus 610 includes one or more parallel conductors of information so that information is transferred quickly among devices coupled to the bus 610. One or more processors 602 for processing information are coupled with the bus 610.

A processor (or multiple processors) 602 performs a set of operations on information as specified by computer program code related to causing a change in an action of a vehicle based on real-time information associated with vehicles. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 610 and placing information on the bus 610. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 602, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 600 also includes a memory 604 coupled to bus 610. The memory 604, such as a random access memory (RAM) or any other dynamic storage device, stores information including processor instructions for causing a change in an action of a vehicle based on real-time information associated with vehicles. Dynamic memory allows information stored therein to be changed by the computer system 600. RAM allows a unit of information stored at a location called a memory address to be stored and retrieved independently of information at neighboring addresses. The memory 604 is also used by the processor 602 to store temporary values during execution of processor instructions. The computer system 600 also includes a read only memory (ROM) 606 or any other static storage device coupled to the bus 610 for storing static information, including instructions, that is not changed by the computer system 600. Some memory is composed of volatile storage that loses the information stored thereon when power is lost. Also coupled to bus 610 is a non-volatile (persistent) storage device 608, such as a magnetic disk, optical disk or flash card, for storing information, including instructions, that persists even when the computer system 600 is turned off or otherwise loses power.

Information, including instructions for causing a change in an action of a vehicle based on real-time information associated with vehicles, is provided to the bus 610 for use by the processor from an external input device 612, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 600. Other external devices coupled to bus 610, used primarily for interacting with humans, include a display device 614, such as a cathode ray tube (CRT), a liquid crystal display (LCD), a light emitting diode (LED) display, an organic LED (OLED) display, a plasma screen, or a printer for presenting text or images, and a pointing device 616, such as a mouse, a trackball, cursor direction keys, or a motion sensor, for controlling a position of a small cursor image presented on the display 614 and issuing commands associated with graphical elements presented on the display 614. In some embodiments, for example, in embodiments in which the computer system 600 performs all functions automatically without human input, one or more of the external input device 612, the display device 614 and the pointing device 616 is omitted.

In the illustrated embodiment, special purpose hardware, such as an application specific integrated circuit (ASIC) 620, is coupled to bus 610. The special purpose hardware is configured to perform operations not performed by processor 602 quickly enough for special purposes. Examples of ASICs include graphics accelerator cards for generating images for display 614, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 600 also includes one or more instances of a communications interface 670 coupled to bus 610. Communications interface 670 provides a one-way or two-way communication coupling to a variety of external devices that operate with their own processors, such as printers, scanners and external disks. In general the coupling is with a network link 678 that is connected to a local network 680 to which a variety of external devices with their own processors are connected. For example, communications interface 670 may be a parallel port or a serial port or a universal serial bus (USB) port on a personal computer. In some embodiments, communications interface 670 is an integrated services digital network (ISDN) card or a digital subscriber line (DSL) card or a telephone modem that provides an information communication connection to a corresponding type of telephone line. In some embodiments, a communications interface 670 is a cable modem that converts signals on bus 610 into signals for a communication connection over a coaxial cable or into optical signals for a communication connection over a fiber optic cable. As another example, communications interface 670 may be a local area network (LAN) card to provide a data communication connection to a compatible LAN, such as Ethernet. Wireless links may also be implemented. For wireless links, the communications interface 670 sends or receives or both sends and receives electrical, acoustic or electromagnetic signals, including infrared and optical signals that carry information streams, such as digital data. For example, in wireless handheld devices, such as mobile telephones like cell phones, the communications interface 670 includes a radio band electromagnetic transmitter and receiver called a radio transceiver. In certain embodiments, the communications interface 670 enables connection to the communication network 105 for causing a change in an action of a vehicle based on real-time information associated with vehicles to the UE 101.

The term "computer-readable medium" as used herein refers to any medium that participates in providing information to processor 602, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 608. Volatile media include, for example, dynamic memory 604. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 620.

Network link 678 typically provides information communication using transmission media through one or more networks to other devices that use or process the information. For example, network link 678 may provide a connection through local network 680 to a host computer 682 or to equipment 684 operated by an Internet Service Provider (ISP). ISP equipment 684 in turn provides data communication services through the public, world-wide packet-switching communication network of networks now commonly referred to as the Internet 690.

A computer called a server host 692 connected to the Internet hosts a process that provides a service in response to information received over the Internet. For example, server host 692 hosts a process that provides information representing video data for presentation at display 614. It is contemplated that the components of computer system 600 can be deployed in various configurations within other computer systems, e.g., host 682 and server 692.

At least some embodiments of the invention are related to the use of computer system 600 for implementing some or all of the techniques described herein. According to one embodiment of the invention, those techniques are performed by computer system 600 in response to processor 602 executing one or more sequences of one or more processor instructions contained in memory 604. Such instructions, also called computer instructions, software and program code, may be read into memory 604 from another computer-readable medium such as storage device 608 or network link 678. Execution of the sequences of instructions contained in memory 604 causes processor 602 to perform one or more of the method steps described herein. In alternative embodiments, hardware, such as ASIC 620, may be used in place of or in combination with software to implement the invention. Thus, embodiments of the invention are not limited to any specific combination of hardware and software, unless otherwise explicitly stated herein.

The signals transmitted over network link 678 and other networks through communications interface 670, carry information to and from computer system 600. Computer system 600 can send and receive information, including program code, through the networks 680, 690 among others, through network link 678 and communications interface 670. In an example using the Internet 690, a server host 692 transmits program code for a particular application, requested by a message sent from computer system 600, through Internet 690, ISP equipment 684, local network 680 and communications interface 670. The received code may be executed by processor 602 as it is received, or may be stored in memory 604 or in storage device 608 or any other non-volatile storage for later execution, or both. In this manner, computer system 600 may obtain application program code in the form of signals on a carrier wave.

Various forms of computer readable media may be involved in carrying one or more sequence of instructions or data or both to processor 602 for execution. For example, instructions and data may initially be carried on a magnetic disk of a remote computer such as host 682. The remote computer loads the instructions and data into its dynamic memory and sends the instructions and data over a telephone line using a modem. A modem local to the computer system 600 receives the instructions and data on a telephone line and uses an infra-red transmitter to convert the instructions and data to a signal on an infra-red carrier wave serving as the network link 678. An infrared detector serving as communications interface 670 receives the instructions and data carried in the infrared signal and places information representing the instructions and data onto bus 610. Bus 610 carries the information to memory 604 from which processor 602 retrieves and executes the instructions using some of the data sent with the instructions. The instructions and data received in memory 604 may optionally be stored on storage device 608, either before or after execution by the processor 602.

FIG. 7 illustrates a chip set or chip 700 upon which an embodiment of the invention may be implemented. Chip set 700 is programmed to cause a change in an action of a vehicle based on real-time information associated with vehicles as described herein and includes, for instance, the processor and memory components described with respect to FIG. 6 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 700 can be implemented in a single chip. It is further contemplated that in certain embodiments the chip set or chip 700 can be implemented as a single "system on a chip." It is further contemplated that in certain embodiments a separate ASIC would not be used, for example, and that all relevant functions as disclosed herein would be performed by a processor or processors. Chip set or chip 700, or a portion thereof, constitutes a means for performing one or more steps of providing user interface navigation information associated with the availability of functions. Chip set or chip 700, or a portion thereof, constitutes a means for performing one or more steps of causing a change in an action of a vehicle based on real-time information associated with vehicles.

In one embodiment, the chip set or chip 700 includes a communication mechanism such as a bus 701 for passing information among the components of the chip set 700. A processor 703 has connectivity to the bus 701 to execute instructions and process information stored in, for example, a memory 705. The processor 703 may include one or more processing cores with each core configured to perform independently. A multi-core processor enables multiprocessing within a single physical package. Examples of a multi-core processor include two, four, eight, or greater numbers of processing cores. Alternatively or in addition, the processor 703 may include one or more microprocessors configured in tandem via the bus 701 to enable independent execution of instructions, pipelining, and multithreading. The processor 703 may also be accompanied with one or more specialized components to perform certain processing functions and tasks such as one or more digital signal processors (DSP) 707, or one or more application-specific integrated circuits (ASIC) 709. A DSP 707 typically is configured to process real-world signals (e.g., sound) in real-time independently of the processor 703. Similarly, an ASIC 709 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 700 includes merely one or more processors and some software and/or firmware supporting and/or relating to and/or for the one or more processors.

The processor 703 and accompanying components have connectivity to the memory 705 via the bus 701. The memory 705 includes both dynamic memory (e.g., RAM, magnetic disk, writable optical disk, etc.) and static memory (e.g., ROM, CD-ROM, etc.) for storing executable instructions that when executed perform the inventive steps described herein to cause a change in an action of a vehicle based on real-time information associated with vehicles. The memory 705 also stores the data associated with or generated by the execution of the inventive steps.

Figure 8:
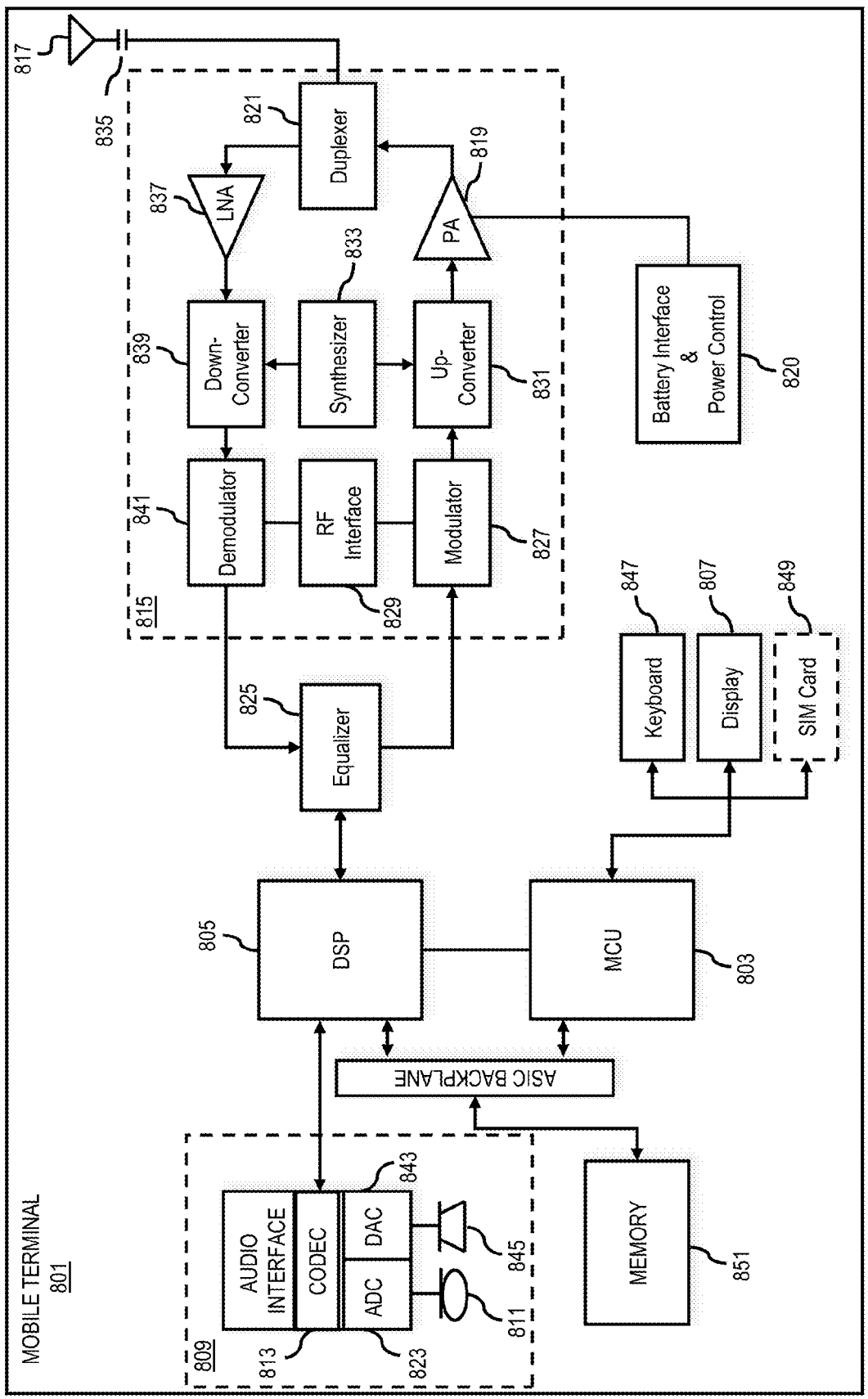
FIG. 8 is a diagram of a mobile terminal that can be used to implement an embodiment of the invention.

FIG. 8 is a diagram of exemplary components of a mobile terminal for communications, which is capable of operating in the system of FIG. 1, according to one embodiment. In some embodiments, mobile terminal 801, or a portion thereof, constitutes a means for performing one or more steps of causing a change in an action of a vehicle based on real-time information associated with vehicles. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 803, a Digital Signal Processor (DSP) 805, and a receiver/transmitter unit including a microphone gain control unit and a speaker gain control unit. A main display unit 807 provides a display to the user in support of various applications and mobile terminal functions that perform or support the steps of causing a change in an action of a vehicle based on real-time information associated with vehicles. The display 807 includes display circuitry configured to display at least a portion of a user interface of the mobile terminal (e.g., mobile telephone). Additionally, the display 807 and display circuitry are configured to facilitate user control of at least some functions of the mobile terminal. An audio function circuitry 809 includes a microphone 811 and microphone amplifier that amplifies the speech signal output from the microphone 811. The amplified speech signal output from the microphone 811 is fed to a coder/decoder (CODEC) 813.

A radio section 815 amplifies power and converts frequency in order to communicate with a base station, which is included in a mobile communication system, via antenna 817. The power amplifier (PA) 819 and the transmitter/modulation circuitry are operationally responsive to the MCU 803, with an output from the PA 819 coupled to the duplexer 821 or circulator or antenna switch, as known in the art. The PA 819 also couples to a battery interface and power control unit 820.

In use, a user of mobile terminal 801 speaks into the microphone 811 and his or her voice along with any detected background noise is converted into an analog voltage. The analog voltage is then converted into a digital signal through the Analog to Digital Converter (ADC) 823. The control unit 803 routes the digital signal into the DSP 805 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 825 for compensation of any frequency-dependent impairments that occur during transmission though the air such as phase and amplitude distortion. After equalizing the bit stream, the modulator 827 combines the signal with a RF signal generated in the RF interface 829. The modulator 827 generates a sine wave by way of frequency or phase modulation. In order to prepare the signal for transmission, an up-converter 831 combines the sine wave output from the modulator 827 with another sine wave generated by a synthesizer 833 to achieve the desired frequency of transmission. The signal is then sent through a PA 819 to increase the signal to an appropriate power level. In practical systems, the PA 819 acts as a variable gain amplifier whose gain is controlled by the DSP 805 from information received from a network base station. The signal is then filtered within the duplexer 821 and optionally sent to an antenna coupler 835 to match impedances to provide maximum power transfer. Finally, the signal is transmitted via antenna 817 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 801 are received via antenna 817 and immediately amplified by a low noise amplifier (LNA) 837. A down-converter 839 lowers the carrier frequency while the demodulator 841 strips away the RF leaving only a digital bit stream. The signal then goes through the equalizer 825 and is processed by the DSP 805. A Digital to Analog Converter (DAC) 843 converts the signal and the resulting output is transmitted to the user through the speaker 845, all under control of a Main Control Unit (MCU) 803 which can be implemented as a Central Processing Unit (CPU).

The MCU 803 receives various signals including input signals from the keyboard 847. The keyboard 847 and/or the MCU 803 in combination with other user input components (e.g., the microphone 811) comprise a user interface circuitry for managing user input. The MCU 803 runs a user interface software to facilitate user control of at least some functions of the mobile terminal 801 to cause a change in an action of a vehicle based on real-time information associated with vehicles. The MCU 803 also delivers a display command and a switch command to the display 807 and to the speech output switching controller, respectively. Further, the MCU 803 exchanges information with the DSP 805 and can access an optionally incorporated SIM card 849 and a memory 851. In addition, the MCU 803 executes various control functions required of the terminal. The DSP 805 may, depending upon the implementation, perform any of a variety of conventional digital processing functions on the voice signals. Additionally, the DSP 805 determines the background noise level of the local environment from the signals detected by the microphone 811 and sets the gain of the microphone 811 to a level selected to compensate for the natural tendency of the user of the mobile terminal 801.

The CODEC 813 includes the ADC 823 and DAC 843. The memory 851 stores various data including call incoming tone data and is capable of storing other data including music data received via, e.g., the global Internet. The software module could reside in RAM memory, flash memory, registers, or any other form of writable storage medium known in the art. The memory 851 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 849 carries, for instance, important information, such as the cellular phone number, the carrier supplying service, subscription details, and security information. The SIM card 849 serves primarily to identify the mobile terminal 801 on a radio network. The SIM card 849 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
    determining, by an apparatus, speeds of a first vehicle and at least one second vehicle, an amount of environment light surrounding the first and second vehicles, a dark area surrounding the first and second vehicles, at least one distance between the first and second vehicles, a brightness and a length of a first headlight source of the first vehicle, and a brightness and a length of a second headlight source of the second vehicle, wherein the determination is based, at least in part, on sensor information associated with a device in the first vehicle and sensor information associated with at least another device in the second vehicle, the device and the at least another device communicate respective sensor information over a communication network to the apparatus; and
    initiating, by the apparatus, an illumination of the dark area using the first headlight source and the second headlight source and a reduction of a dazzling effect of the first headlight source and the second headlight source based on the speeds, the amount of environment light, the at least one distance, and the brightness and the lengths of the first and second headlight sources.

2. The method of claim 1, wherein the sensor information includes location information, speed information, angle information, or a combination thereof, and the dazzling effect is adjusted more as the at least one distance becomes shorter, and wherein the dark area surrounding the first and second vehicles includes a dark area between the first and second vehicles.

3. The method of claim 1, wherein the dazzling effect is adjusted, at least in part, via a tilting, a dimming, a brightening, a turning on/off, or a combination thereof of at least one of the first headlight source and the second headlight source.

4. The method of claim 1, further comprising: determining whether the device and the at least another device are heading in a same direction or an opposing direction, wherein the dazzling effect is reduced based, at least in part, on the determination of direction.

5. The method of claim 1, further comprising: determining that the device and the at least another device are on a collision path based, at least in part, on the at least one distance.

6. The method of claim 5, further comprising: initiating a presentation of a collision warning associated with at least one of the device and the at least another device based on the determination of the collision path.

7. The method of claim 1, wherein the dazzling effect is further reduced based on environmental information, specification information, or a combination thereof associated with at least one of the device and the at least another device.

8. The method of claim 7, wherein the environmental information includes terrain information, weather information, structural information, or a combination thereof.

9. The method of claim 7, wherein the specification information includes a radius, an angle, functionality, or a combination thereof of at least one of the first headlight source and the second headlight source.

10. The method of claim 1, wherein the apparatus is embedded in a server.

11. The method of claim 1, wherein the apparatus is embedded in the device, the at least another device, or a combination thereof.

12. An apparatus comprising:
    at least one processor; and
    at least one memory including computer program code for one or more programs,
    the at least one memory and the computer program code configured to, with the at least one processor, cause the apparatus to perform at least the following,
        determine speeds of a first vehicle and at least one second vehicle, an amount of environment light surrounding the first and second vehicles, a dark area surrounding the first and second vehicles, at least one distance between the first and second vehicles, a brightness and a length of a first headlight source of the first vehicle, and a brightness and a length of a second headlight source of the second vehicle, wherein the determination is based, at least in part, on sensor information associated with a device in the first vehicle and sensor information associated with at least another device in the second vehicle, the device and the at least another device communicate respective sensor information over a communication network to the apparatus; and initiate an illumination of the dark area using the first headlight source and the second headlight source and a reduction of a dazzling effect of the first headlight source and the second headlight source based on the speeds, the amount of environment light, the at least one distance, and the brightness and the lengths of the first and second headlight sources.

13. The apparatus of claim 12, wherein the sensor information includes location information, speed information, angle information, or a combination thereof.

14. The apparatus of claim 12, wherein the dazzling effect is adjusted, at least in part, via a tilting, a dimming, a brightening, a turning on/off, or a combination thereof of at least one of the first headlight source and the second headlight source.

15. The apparatus of claim 12, wherein the apparatus is further caused to: determine whether the device and the at least another device are heading in a same direction or an opposing direction, wherein the dazzling effect is reduced based, at least in part, on the determination of direction.

16. The apparatus of claim 12, wherein the apparatus is further caused to: determine that the device and the at least another device are on a collision path based, at least in part, on the at least one distance.

17. The apparatus of claim 16, wherein the apparatus is further caused to: initiate a presentation of a collision warning associated with at least one of the device and the at least another device based on the determination of the collision path.

18. The apparatus of claim 12, wherein the dazzling effect is further reduced based on environmental information, specification information, or a combination thereof associated with at least one of the device and the at least another device.

19. The apparatus of claim 18, wherein the environmental information includes terrain information, weather information, structural information, or a combination thereof.

20. The apparatus of claim 18, wherein the specification information includes a radius, an angle, functionality, or a combination thereof of at least one of the first headlight source and the second headlight source.

* * * * *